(12) United States Patent
Iwamoto et al.

(10) Patent No.: US 12,511,615 B2
(45) Date of Patent: Dec. 30, 2025

(54) ARTICLE MANAGEMENT SYSTEM, ARTICLE MANAGEMENT METHOD, AND ARTICLE MANAGEMENT PROGRAM

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Setagaya-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/980,620

(22) Filed: Nov. 4, 2022

(65) Prior Publication Data
US 2023/0143090 A1    May 11, 2023

(30) Foreign Application Priority Data
Nov. 8, 2021   (JP) .................................. 2021-182082

(51) Int. Cl.
*G06Q 10/087*    (2023.01)
(52) U.S. Cl.
CPC .................................. *G06Q 10/087* (2013.01)
(58) Field of Classification Search
CPC ..................................................... G06Q 10/087
USPC ........................................................... 705/28
See application file for complete search history.

(56) References Cited

U.S. PATENT DOCUMENTS

| | | | |
|---|---|---|---|
| 10,894,664 B1* | 1/2021 | Brady ................... | G05D 1/0088 |
| 2018/0341942 A1* | 11/2018 | DeBates ............. | G06Q 20/4014 |
| 2019/0168392 A1* | 6/2019 | Väin ....................... | G06Q 10/00 |
| 2020/0406459 A1* | 12/2020 | Park ........................ | G06V 20/20 |
| 2021/0201390 A1 | 7/2021 | Matsunami et al. | |

FOREIGN PATENT DOCUMENTS

| | | | | |
|---|---|---|---|---|
| CN | 109081028 A | * | 12/2018 | ............... B65G 1/04 |
| CN | 113762048 A | * | 12/2021 | |
| CN | 115034773 A | * | 9/2022 | |
| CN | 115744210 A | * | 3/2023 | |
| JP | 2006-209382 A | | 8/2006 | |
| JP | 2016-045665 A | | 4/2016 | |
| JP | 2021-108002 A | | 7/2021 | |
| KR | 2004050168 A | * | 6/2004 | |
| WO | WO-0233511 A2 | * | 4/2002 | ......... G06K 19/0723 |
| WO | WO-2019021058 A2 | * | 1/2019 | ............. B25J 9/162 |
| WO | WO-2020071060 A1 | * | 4/2020 | ...... B60W 60/00256 |

* cited by examiner

*Primary Examiner* — Luna Champagne
(74) *Attorney, Agent, or Firm* — Dinsmore & Shohl LLP (57) ABSTRACT

An article management system that manages a delivered article by using a computer is provided. The article management system stores identification information identifying an article to be delivered to a user thereof and use information about use of the article attached by a sender of the article while associating them with each other; and reads, when the user uses the article, the identification information attached to the article, and extracts and outputs the use information associated with the identification information.

3 Claims, 8 Drawing Sheets

ARTICLE MANAGEMENT SYSTEM, ARTICLE MANAGEMENT METHOD, AND ARTICLE MANAGEMENT PROGRAM

CROSS REFERENCE TO RELATED APPLICATIONS

This application is based upon and claims the benefit of priority from Japanese patent application No. 2021-182082, filed on Nov. 8, 2021, the disclosure of which is incorporated herein in its entirety by reference.

BACKGROUND

The present disclosure relates to an article management system, an article management method, and an article management program.

Japanese Unexamined Patent Application Publication No. 2016-45665 discloses a system for automatically delivering articles to storage lockers partitioned into a plurality of storage spaces.

SUMMARY

It should be noted that, in the case where the sender of an article to be delivered sends information about the use of the article together with the article itself to a user of the article, the timing at which, for example, the article itself is delivered to the user is not necessarily appropriate as the timing at which the information is shown to the user. Since the information presented to the user is the information about the use of the delivered article, it is desirable if the information is presented to the user at the same timing as the timing at which the user uses the article.

In view of the above-described circumstances, an object of the present disclosure is to provide an article management system capable of presenting information about the use of a delivered article to a user of the article at the same timing as the timing at which the user uses the article.

A first exemplary aspect is an article management system configured to manage a delivered article by using a computer, the article management system being further configured to:
  store identification information identifying an article to be delivered to a user thereof and use information about use of the article attached by a sender of the article while associating them with each other; and
  read, when the user uses the article, the identification information attached to the article, and extract and output the use information associated with the identification information.

Further, another exemplary aspect is an article management method for managing a delivered article by using a computer, the article management method including:
  storing identification information identifying an article to be delivered to a user thereof and use information about use of the article attached by a sender of the article while associating them with each other; and
  reading, when the user uses the article, the identification information attached to the article, and extracting and outputting the use information associated with the identification information.

Further, another exemplary aspect is an article management program for managing a delivered article, the article management program being configured to cause a computer to perform:
  storing identification information identifying an article to be delivered to a user thereof and use information about use of the article attached by a sender of the article while associating them with each other; and
  reading, when the user uses the article, the identification information attached to the article, and extracting and outputting the use information associated with the identification information.

As described above, according to an aspect of the present disclosure, identification information identifying the article to be delivered to the user thereof and use information about the use of the article attached by the sender of the article are associated with each other and stored. Further, when the user uses the article, the identification information attached to the article is read, and the use information associated with the identification information is extracted and output. Therefore, it is possible to show the use information about the use of the delivered article to the user thereof at the same timing as the timing at which the user, who is the recipient of the article, uses the article.

An indoor robot capable of taking out an article stored indoors may store the identification information and the use information while associating them with each other, and when the user uses the article, the indoor robot may take out the stored article, deliver the article to the user, and extract and output the use information associated with the identification information. By the above-described configuration, it is possible to present the use information to the user when the indoor robot delivers the article to the user.

When the indoor robot takes out the stored article, the indoor robot may read the identification information attached to the article and extract the use information associated with the identification information. By the above-described configuration, it is possible to immediately extract the use information when the indoor robot takes out the article.

The indoor robot may erase the stored use information after taking out the stored article and outputting the use information. By the above-described configuration, the storage capacity can be saved.

According to the present disclosure, it is possible to provide an article management system capable of presenting information about the use of a delivered article to a user at the same timing as the timing at which the user uses the article.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments will be described hereinafter in detail with reference to the drawings. The same or corresponding elements are denoted by the same reference numerals or symbols throughout the drawings, and redundant descriptions thereof are omitted as appropriate for clarifying the descriptions.

First Embodiment

Figure 1:
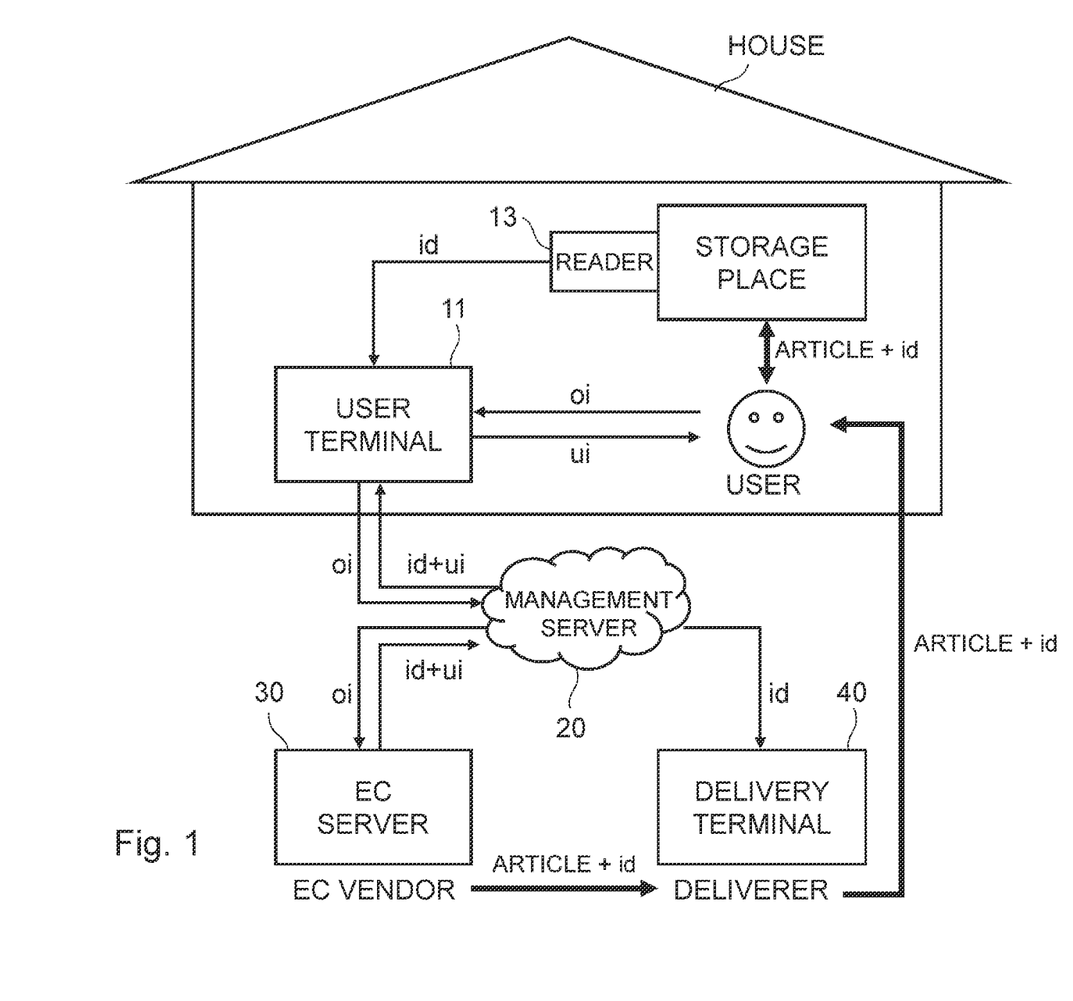
FIG. 1 is a block diagram of an article management system according to a first embodiment.

Firstly, an article management system and an article management method according to a first embodiment will be described with reference to FIG. 1. FIG. 1 is a block diagram of the article management system according to the first embodiment. The article management system according to the first embodiment is an article management system that manages delivered articles by using a computer. As shown in FIG. 1, the article management system according to this embodiment includes a user terminal 11, a management server 20, an EC (Electronic Commerce) server 30, and a delivery terminal 40.

In this embodiment, a user purchases an article from an EC site on the Internet managed by an EC vendor, and the article is delivered from the EC vendor, who is the sender, to the user, who is the recipient, by a deliverer (i.e., a person, a robot, or the like who delivers the article).

Each of the user terminal 11, the management server 20, the EC server 30, and the delivery terminal 40 includes an arithmetic unit such as a CPU (Central Processing Unit), and a storage unit such as a RAM (Random Access Memory) and a ROM (Read Only Memory) in which various control programs and data are stored. That is, each of the user terminal 11, the management server 20, the EC server 30, and the delivery terminal 40 has functions as a computer, and performs the below-described processes based on the various control programs and the like.

As shown in FIG. 1, the user terminal 11 is a communication terminal that is connected to the management server 20 through a cable or wirelessly so that the user terminal 11 can communicate with the management server 20. The user terminal 11 is not limited to any particular terminal as long as it can communicate with the management server 20. For example, the user terminal 11 may be a mobile communication terminal such as a smartphone or a tablet-type terminal, or a PC (Personal Computer) installed indoors.

Note that although the user terminal 11 is located in a living space (e.g., a living room) of a house in FIG. 1, the user terminal 11 may be located outside the living space in the house, or outside the house. Further, in this specification, the meaning of the term "living space" includes an office space.

As shown in FIG. 1, a user inputs order information oi to the user terminal 11. The order information oi is transmitted from the user terminal 11 to the management server 20. The order information oi is information about an article to be delivered, and includes, for example, information about a commodity name, a quantity, a desired delivery date, a delivery destination, and the like Further, the user terminal 11 receives article identification information id and use information ui issued by the EC server 30 from the management server 20, and stores the received article identification information id and the use information ui while associating them with each other.

Further, when the user uses the article, the user terminal 11 receives the article identification information id read by a reader 13. Then, the user terminal 11 extracts and outputs the use information ui associated with the article identification information id.

The management server 20 is a server that manages the article management system. As shown in FIG. 1, the management server 20 is connected to the user terminal 11, the EC server 30, and the delivery terminal 40 so that the management server 20 can communicate with these apparatuses. The management server 20 is, for example, a cloud server. The management server 20 transmits order information oi received from the user terminal 11 to the EC server 30.

Further, the management server 20 receives article identification information id and use information ui issued by the EC server 30, and transmits them to the user terminal 11.

Further, the management server 20 also transmits the article identification information id to the delivery terminal 40. The article identification information id is information identifying the article to be delivered, and is, for example, an order number.

The EC server 30 is, for example, a server constituting an EC site on the Internet managed by an EC vendor. As shown in FIG. 1, the EC server 30, which is connected to the management server 20 so as to be able to communicate with the management server 20, issues article identification information id and use information ui according to the order information of received from the management server 20, and transmits them to the management server 20.

The use information ui is information about the use of the article, which the sender of the article sends to the user together with the article. The use information ui is information which the user, who is the recipient, should refer to when he/she uses the article. The use information ui is not limited to any particular information as long as it is information about the use of the delivered article. The use information ui includes, for example, a document(s) for the use of the article attached thereto and/or a manual(s) therefor. In the case where the delivered article is food, the use information ui includes, for example, information about a cooking method, a best-before date, an eat-by date, and the like of the article.

The delivery terminal 40 is, for example, a terminal carried by a deliverer, and is a communication terminal capable of reading the article identification information id attached to the article. As shown in FIG. 1, the delivery terminal 40 is connected to the management server 20 so as to be able to communicate with the management server 20. The delivery terminal 40 receives the article identification information id from the management server 20. By reading the article identification information id attached to the article by using the delivery terminal 40, the deliverer can identify the article to be delivered.

Note that the delivery terminal 40 may be a delivery robot, and in such a case, the delivery robot may deliver the article on behalf of the deliverer.

The article identification information id is, for example, text (i.e., letters), a symbol, a bar code, a 2D (two-dimensional) code, a RFID (Radio Frequency IDentifier), or the like, and is directly or indirectly attached to the article to be delivered. More specifically, the article identification information id is directly stuck on the article or embedded in the article. Alternatively, the article identification information id may be indirectly attached to the article, such as being stuck on or embedded in the package of the article. Note that the package is not limited to any particular packages, and may be, for example, a box, a bag, or a sheet made of paper or vinyl. The package may be a disposable type, or may be a reusable type such as a returnable box.

Note that as shown in FIG. 1, the article with the article identification information id attached thereto is delivered from the EC vendor to the user by the deliverer.

Note that when the delivery of the article is completed, the user does not necessarily have to receive the article. That is, it is sufficient if the article arrives at the house. For example, the article may be placed in a predetermined place (e.g., a delivery box or the like) in the house. Alternatively, a robot may receive the article which will be described later in detail.

In the example shown in FIG. 1, the delivered article is stored in a storage place by the user. In the example shown in FIG. 1, a reader 13 for reading the article identification information id is provided in the storage place. The reader 13 is connected to the user terminal 11 so as to be able to communicate with the user terminal 11. When the delivered article is stored in the storage place, the article identification information id attached to the article is read by using the reader 13 and transmitted to the user terminal 11. Therefore, by the user terminal 11, the user can check whether the article is stored in the storage place.

Further, when the user takes out the delivered article from the storage place, the article identification information id attached to the article is read by using the reader 13 and transmitted to the user terminal 11. Then, by the user terminal 11, the use information ui associated with this article identification information id is extracted and output for the user.

Note that the reader 13 may or may not be fixed to the storage location.

As described above, in the article management system according to this embodiment, the user terminal 11 stores the article identification information id for identifying the article to be delivered to the user and the use information ui about the use of the article while associating them with each other. When the user takes out the article from the storage place and uses the article, the article identification information id attached to the article is read by the reader 13, and the article identification information id is transmitted from the reader 13 to the user terminal 11.

Then, by the user terminal 11, the use information ui associated with this article identification information id is extracted and output for the user. For example, the use information ui is output in the form of text (i.e., letters), still images, moving images, or the like on the monitor of the user terminal 11. Alternatively, the use information ui is output as voice (e.g., speech) from the speaker of the user terminal 11. Needless to say, the use information ui may be simultaneously output on the monitor and from the speaker as text or the like and as voice, respectively.

As described above, in the article management system according to this embodiment, it is possible to present the information about the use of the delivered article to the user at the same timing as the timing at which the user uses the article.

Note that, in this embodiment, the management server 20, instead of the user terminal 11, may store the article identification information id and the use information ui while associating them with each other. When the user takes out the article from the storage place and uses the article, for example, the user terminal 11 transmits the article identification information id received from the reader 13 to the management server 20. Upon receiving the article identification information id, the management server 20 extracts the use information ui associated with the article identification information id and transmits the extracted use information ui to the user terminal 11. Then, the user terminal 11 may output the use information ui received from the management server 20 for the user.

Second Embodiment

Figure 2:
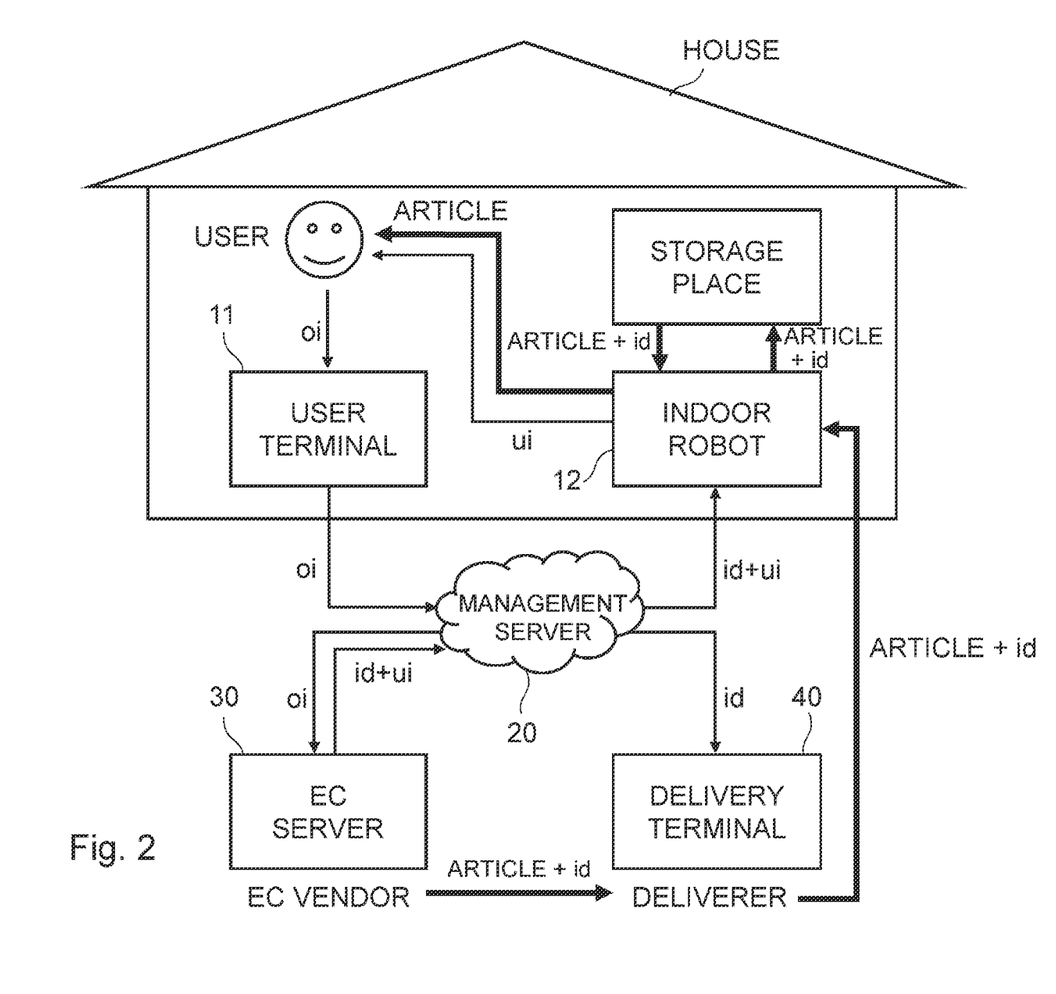
FIG. 2 is a block diagram of an article management system according to a second embodiment.

Next, an article management system and an article management method according to a second embodiment will be described with reference to FIG. 2. FIG. 2 is a block diagram of the article management system according to the second embodiment.

As shown in FIG. 2, the article management system according to this embodiment includes an indoor robot 12 in addition to the user terminal 11, the management server 20, the EC server 30, and the delivery terminal 40 shown in FIG. 1.

In the article management system according to the first embodiment shown in FIG. 1, the management server 20 receives article identification information id and use information ui issued by the EC server 30, and transmits them to the user terminal 11. In contrast to this, in the article management system according to the second embodiment shown in FIG. 2, the management server 20 receives article identification information id and use information ui that are issued by the EC server 30 according to order information oi, and transmits them to the indoor robot 12 instead of transmitting to the user terminal 11.

The indoor robot 12 is connected to the management server 20 so as to be able to communicate with the management server 20, and stores the use information ui and the article identification information id received from the management server 20 while associating them with each other. The indoor robot 12 also includes, for example, an arithmetic unit and a storage unit in which various control programs, data, and the like are stored, has functions as a computer, and performs the below-described processes based on the various control programs.

Note that the indoor robot 12 is a robot that can move indoors. The indoor robot 12, which includes, for example, one or more arms for grasping an article, receives the delivered article from the deliverer and stores the received article in a predetermined storage place. Further, the indoor robot 12 takes out an article stored in the storage place and delivers the article to the user.

As shown in FIG. 2, when the user uses the article, the indoor robot 12 takes out the article from the storage place and delivers the article to the user. When doing so, the indoor robot 12 reads the article identification information id attached to the article, extracts the use information ui associated with the article identification information id, and outputs the extracted use information ui for the user. That is, the indoor robot 12 has the function of the reader 13 shown in FIG. 1.

As described above, in the article management system according to this embodiment, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

Further, the indoor robot 12 may erase the stored use information ui after taking out the article from the storage place and outputting the use information ui. This makes it possible to save the storage capacity.

The rest of the configuration is similar to that of the first embodiment, and therefore the description thereof is omitted.

First Modified Example

Figure 3:
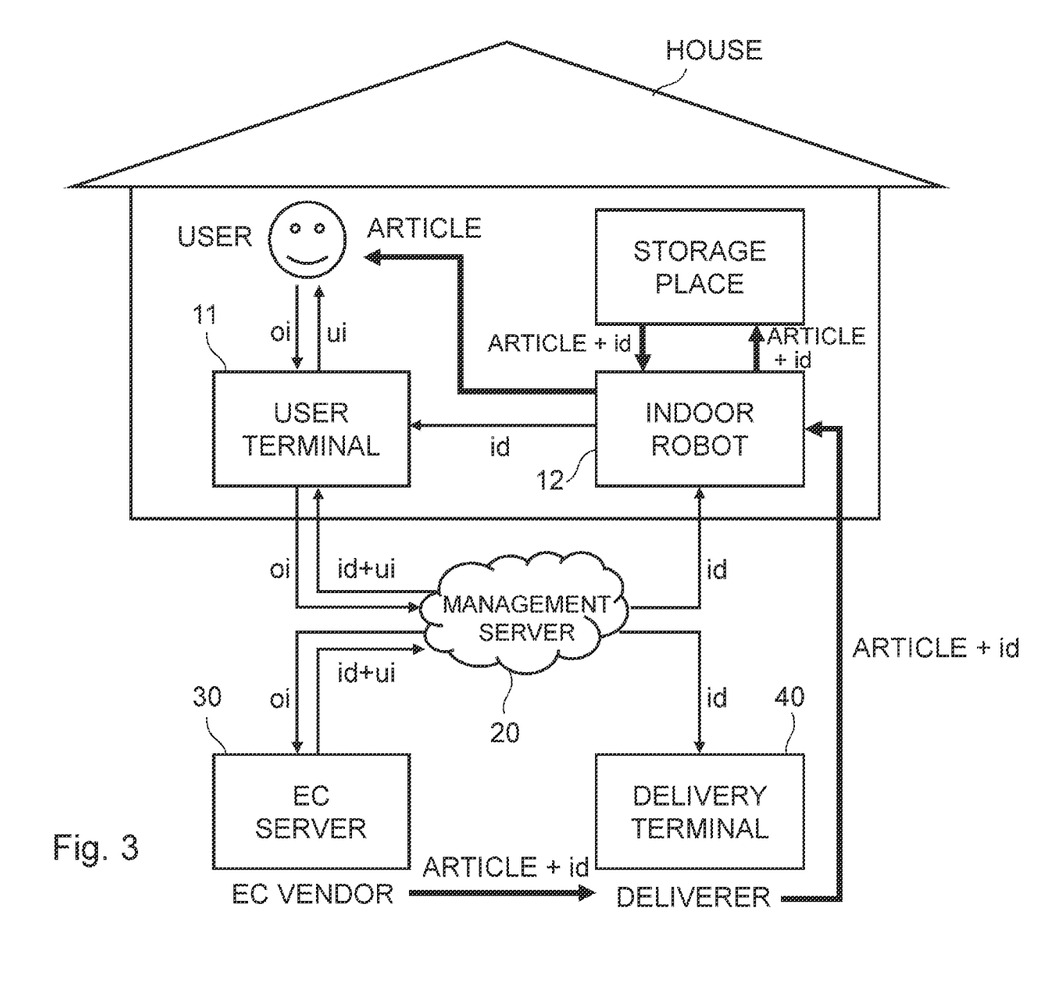
FIG. 3 is a block diagram of an article management system according to a first modified example of the second embodiment.

Next, an article management system and an article management method according to a first modified example of the second embodiment will be described with reference to FIG. 3. FIG. 3 is a block diagram of the article management system according to the first modified example of the second embodiment.

As shown in FIG. 3, the article management system according to the first modified example also includes the user terminal 11, the indoor robot 12, the management server 20, the EC server 30, and the delivery terminal 40 as in the case of the article management system shown in FIG. 2.

In the article management system according to the second embodiment shown in FIG. 2, the management server 20 receives article identification information id and use information ui that are issued by the EC server 30 according to order information oi, and transmits them to the indoor robot 12. In contrast to this, in the article management system according to the first modified example shown in FIG. 3, the management server 20 receives article identification information id and use information ui that are issued by the EC server 30 according to order information oi, and transmits them to the user terminal 11 instead of transmitting to the indoor robot 12. The user terminal 11 stores the article identification information id and the use information ui received from the management server 20 while associating them with each other. Note that only the article identification information id is transmitted from the management server 20 to the indoor robot 12.

As shown in FIG. 3, when the user uses the article, the indoor robot 12 takes out the article from the storage place and delivers the article to the user. When doing so, the indoor robot 12 reads the article identification information id attached to the article and transmits the article identification information id to the user terminal 11. That is, the indoor robot 12 has the function of the reader 13 shown in FIG. 1. Then, the user terminal 11 extracts the use information ui associated with the article identification information id and outputs the extracted use information ui for the user.

As described above, in the article management system according to the first modified example, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

The rest of the configuration is similar to that of the second embodiment shown in FIG. 2, and therefore the description thereof is omitted.

Second Modified Example

Figure 4:
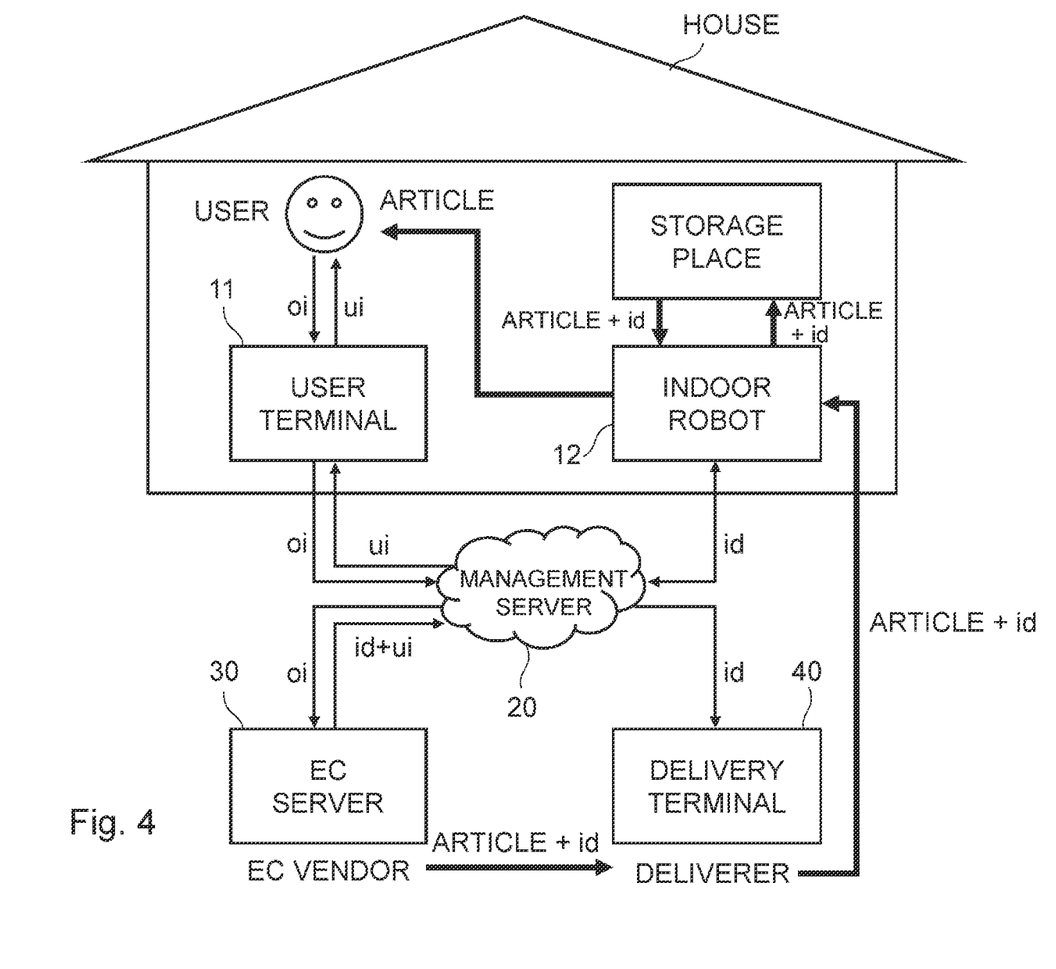
FIG. 4 is a block diagram of an article management system according to a second modified example of the second embodiment.

Next, an article management system and an article management method according to a second modified example of the second embodiment will be described with reference to FIG. 4. FIG. 4 is a block diagram of the article management system according to the second modified example of the second embodiment.

As shown in FIG. 4, the article management system according to the second modified example also includes the user terminal 11, the indoor robot 12, the management server 20, the EC server 30, and the delivery terminal 40 as in the case of the article management system shown in FIG. 2.

In the article management system according to the second embodiment shown in FIG. 2, the management server 20 receives article identification information id and use information ui that are issued by the EC server 30 according to order information oi, and transmits them to the indoor robot 12. In contrast to this, in the article management system according to the second modified example shown in FIG. 4, the management server 20 receives article identification information id and use information ui that are issued by the EC server 30 according to order information oi, and stores the article identification information id and the use information ui while associating them with each other. Only the article identification information id is transmitted from the management server 20 to the indoor robot 12.

As shown in FIG. 4, when the user uses the article, the indoor robot 12 takes out the article from the storage place and delivers the article to the user. When doing so, the indoor robot 12 reads the article identification information id attached to the article and transmits the article identification information id to the management server 20. That is, the indoor robot 12 has the function of the reader 13 shown in FIG. 1. Upon receiving the article identification information id, the management server 20 extracts the use information ui associated with the article identification information id and transmits the extracted use information ui to the user terminal 11. Then, the user terminal 11 outputs the use information ui received from the management server 20 for the user.

As described above, in the article management system according to the second modified example, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

Further, in FIG. 4, the management server 20 may transmit the extracted use information ui to the indoor robot 12 instead of transmitting to the user terminal 11, and the indoor robot 12 may output the use information ui received from the management server 20 for the user.

The rest of the configuration is similar to that of the second embodiment shown in FIG. 2, and therefore the description thereof is omitted.

Third Embodiment

Figure 5:
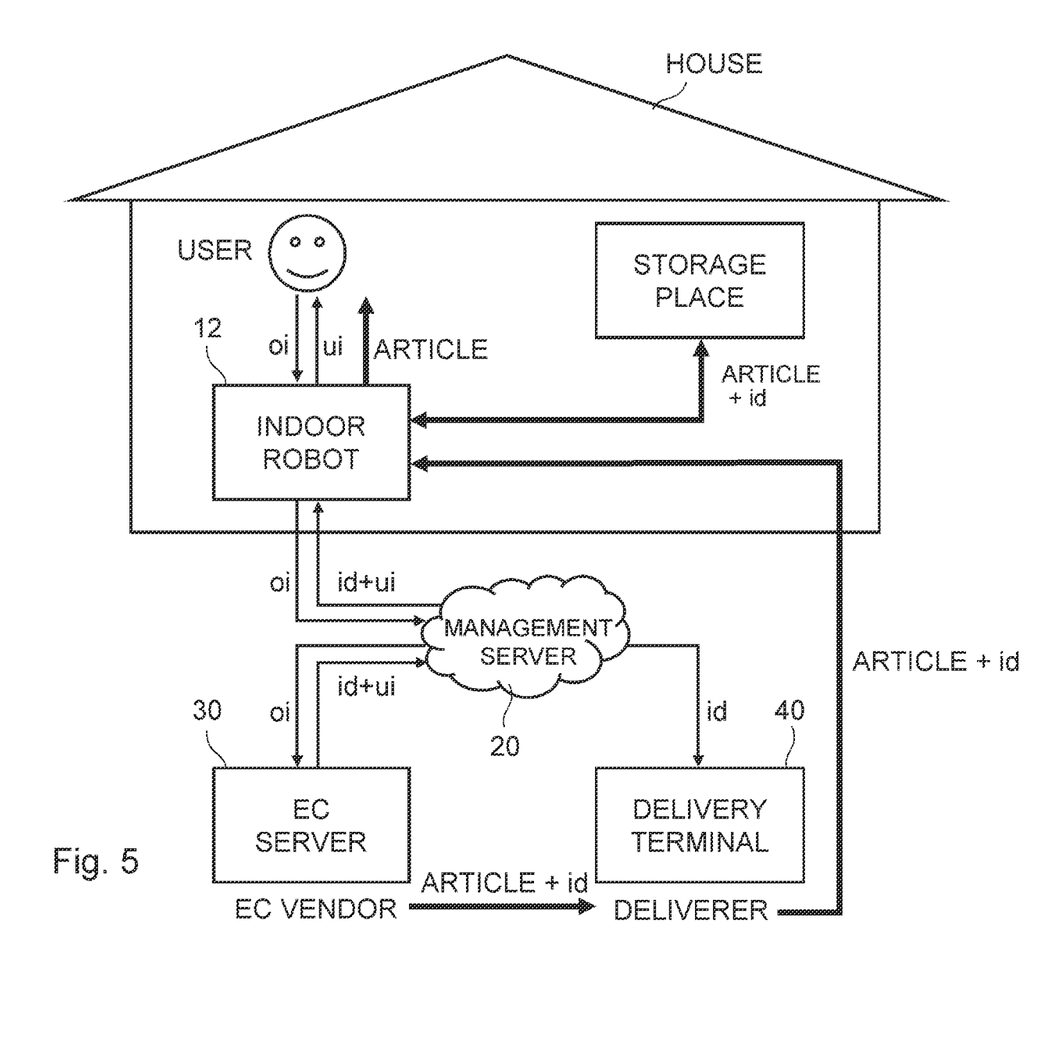
FIG. 5 is a block diagram of an article management system according to a third embodiment.

Next, an article management system and an article management method according to a third embodiment will be described with reference to FIG. 5. FIG. 5 is a block diagram of the article management system according to the third embodiment.

As shown in FIG. 5, the article management system according to this embodiment includes the indoor robot 12, the management server 20, the EC server 30, and the delivery terminal 40 shown in FIG. 2, but does not include the user terminal 11. Note that the indoor robot 12 also has the function as the user terminal 11.

As shown in FIG. 5, a user inputs order information oi to the indoor robot 12. The order information oi is transmitted from the indoor robot 12 to the management server 20.

As shown in FIG. 5, the management server 20 receives article identification information id and use information ui that are issued by the EC server 30 according to order information oi, and transmits them to the indoor robot 12. The indoor robot 12 stores the use information ui and the article identification information id received from the management server 20 while associating them with each other.

As shown in FIG. 3, when the user uses the article, the indoor robot 12 takes out the article from the storage place and delivers the article to the user. When doing so, the indoor robot 12 reads the article identification information id attached to the article, extracts the use information ui associated with the article identification information id, and outputs the extracted use information ui for the user. That is, the indoor robot 12 has the function of the reader 13 shown in FIG. 1.

As described above, in the article management system according to this embodiment, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

Further, in this embodiment, the management server 20, instead of the indoor robot 12, may store the article identification information id and the use information ui while associating them with each other. When the user takes out the article from the storage place and uses the article, for example, the indoor robot 12 transmits the article identification information id, which is read by the indoor robot 12, to the management server 20. Upon receiving the article identification information id, the management server 20 extracts the use information ui associated with the article identification information id and transmits the extracted use information ui to the indoor robot 12. Then, the indoor robot 12 may output the use information ui received from the management server 20 for the user.

The rest of the configuration is similar to that of the second embodiment shown in FIG. 2, and therefore the description thereof is omitted.

Fourth Embodiment

Figure 6:
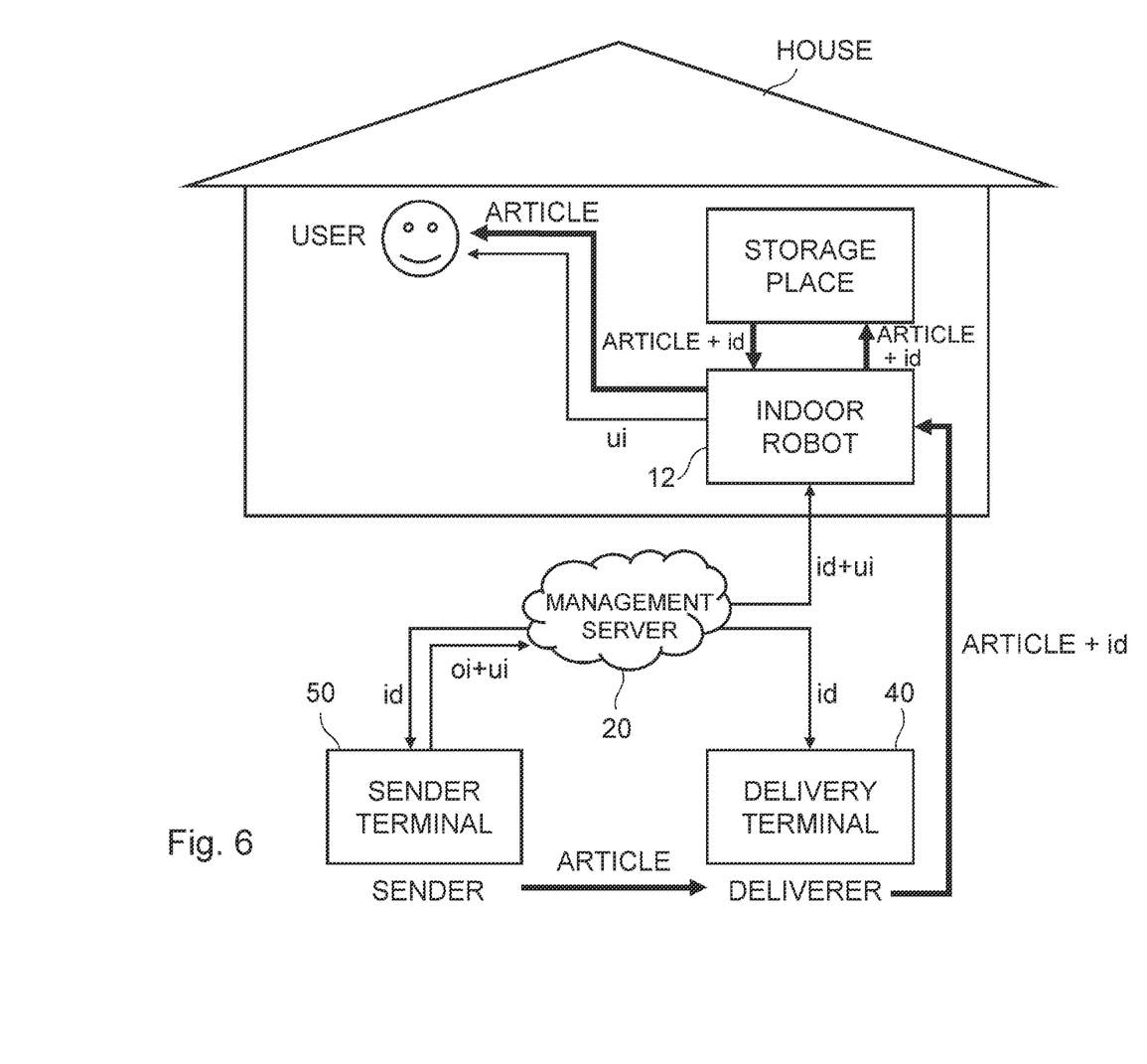
FIG. 6 is a block diagram of an article management system according to a fourth embodiment.

Next, an article management system and an article management method according to a fourth embodiment will be described with reference to FIG. 6. FIG. 6 is a block diagram of the article management system according to the fourth embodiment.

As shown in FIG. 6, the article management system according to this embodiment includes, in addition to the indoor robot 12, the management server 20, and the delivery terminal 40 shown in FIG. 5, a sender terminal 50 instead of the EC server 30.

In the article management system according to this embodiment, instead of delivering an article purchased from an EC vendor to a user, an article (e.g., a present) is delivered from a sender to a user. As shown in FIG. 6, the sender inputs order information of and use information ui to the sender terminal 50. The order information oi and the use information ui are transmitted from the sender terminal 50 to the management server 20.

As shown in FIG. 6, the sender terminal 50 is a communication terminal that is connected to the management server 20 through a cable or wirelessly so that the sender terminal 50 can communicate with the management server 20. The sender terminal 50 is not limited to any particular terminal as long as it can communicate with the management server 20. For example, the sender terminal 50 may be a mobile communication terminal such as a smartphone or a tablet-type terminal, or a PC (Personal Computer).

As shown in FIG. 6, the management server 20 issues article identification information id according to the order information oi received from the sender terminal 50, and transmits the article identification information id to the sender terminal 50 and the management server 20. Further, the management server 20 transmits the article identification information id and the use information ui to the indoor robot 12. The indoor robot 12 stores the use information ui and the article identification information id received from the management server 20 while associating them with each other.

As shown in FIG. 6, when the user uses the article, the indoor robot 12 takes out the article from the storage place and delivers the article to the user. When doing so, the indoor robot 12 reads the article identification information id attached to the article, extracts the use information ui associated with the article identification information id, and outputs the extracted use information ui for the user. That is, the indoor robot 12 has the function of the reader 13 shown in FIG. 1.

As described above, in the article management system according to this embodiment, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

Further, in FIG. 6, the management server 20, instead of the indoor robot 12, may store the article identification information id and the use information ui while associating them with each other. When the user takes out the article from the storage place and uses the article, for example, the indoor robot 12 transmits the article identification information id, which is read by the indoor robot 12, to the management server 20. Upon receiving the article identification information id, the management server 20 extracts the use information ui associated with the article identification information id and transmits the extracted use information ui to the indoor robot 12. Then, the indoor robot 12 may output the use information ui received from the management server 20 for the user.

Further, the first embodiment and this embodiment can be combined with each other. In such a case, instead of the indoor robot 12, the user terminal 11 may store the use information ui and the article identification information id received from the management server 20 while associating them with each other.

The rest of the configuration is similar to that of the third embodiment shown in FIG. 5, and therefore the description thereof is omitted.

First Modified Example

Figure 7:
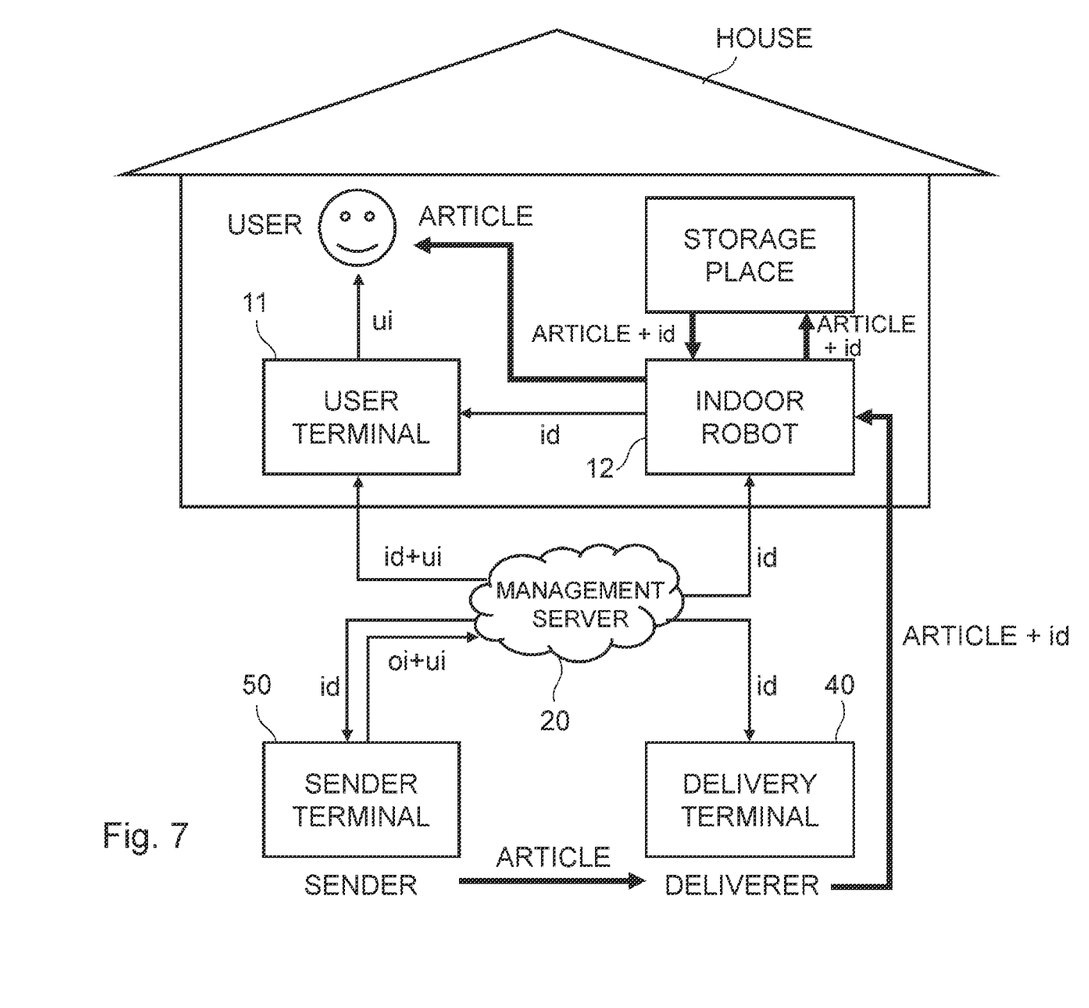
FIG. 7 is a block diagram of an article management system according to a first modified example of the fourth embodiment.

Next, an article management system and an article management method according to a first modified example of the fourth embodiment will be described with reference to FIG.

7. FIG. 7 is a block diagram of the article management system according to the first modified example of the fourth embodiment.

As shown in FIG. 7, the article management system according to the first modified example also includes the user terminal 11 in addition to the indoor robot 12, the management server 20, the delivery terminal 40, and the sender terminal 50 shown in FIG. 6.

In the article management system according to the fourth embodiment shown in FIG. 6, the management server 20 transmits the article identification information id and the use information ui to the indoor robot 12. In contrast to this, in the article management system according to the first modified example shown in FIG. 7, the management server 20 transmits the article identification information id and the use information ui to the user terminal 11 instead of transmitting to the indoor robot 12. The user terminal 11 stores the article identification information id and the use information ui received from the management server 20 while associating them with each other. Note that only the article identification information id is transmitted from the management server 20 to the indoor robot 12.

As shown in FIG. 7, when the user uses the article, the indoor robot 12 takes out the article from the storage place and delivers the article to the user. When doing so, the indoor robot 12 reads the article identification information id attached to the article and transmits the article identification information id to the user terminal 11. That is, the indoor robot 12 has the function of the reader 13 shown in FIG. 1. Then, the user terminal 11 extracts the use information ui associated with the article identification information id and outputs the extracted use information ui for the user.

As described above, in the article management system according to the first modified example, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

The rest of the configuration is similar to that of the fourth embodiment shown in FIG. 6, and therefore the description thereof is omitted.

Second Modified Example

Figure 8:
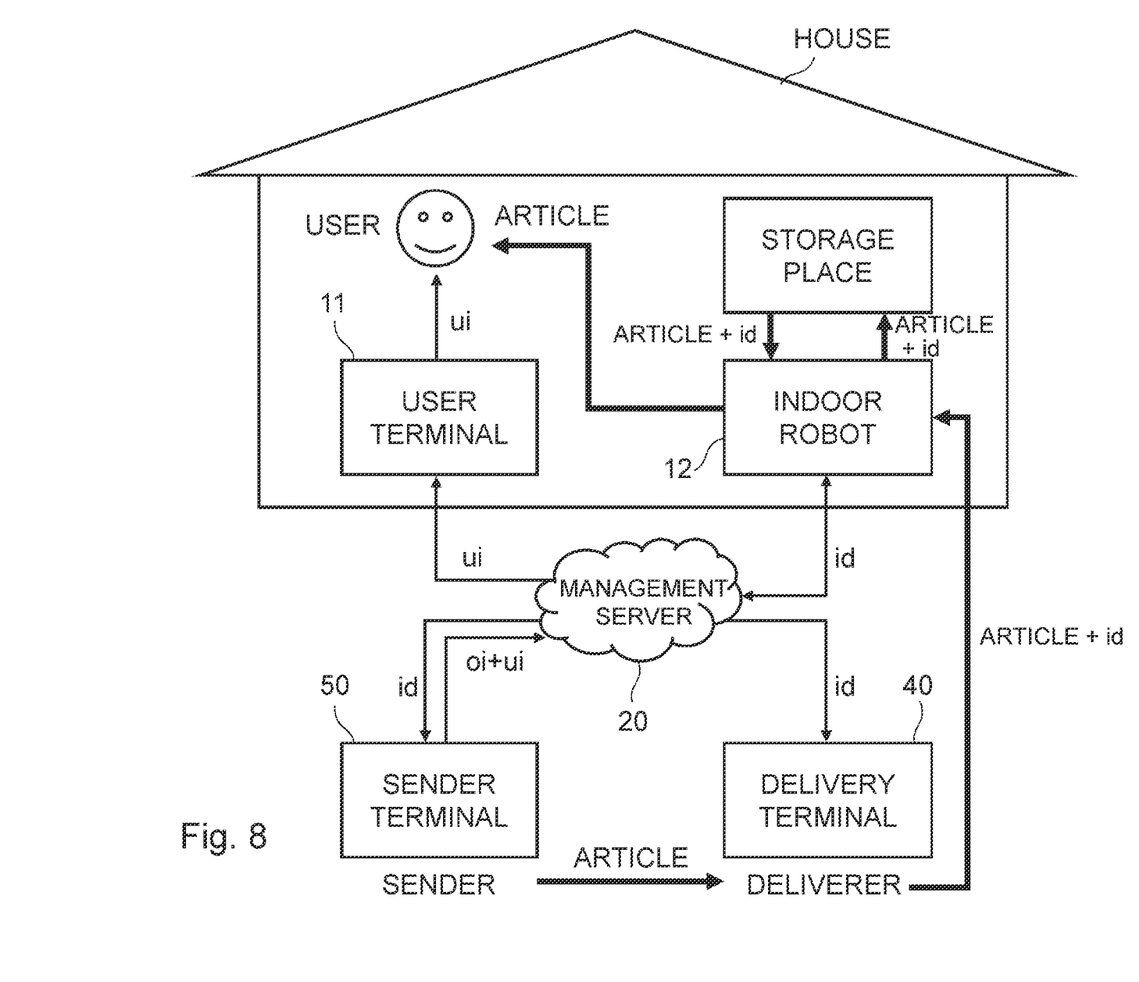
FIG. 8 is a block diagram of an article management system according to a second modified example of the fourth embodiment.

Next, an article management system and an article management method according to a second modified example of the fourth embodiment will be described with reference to FIG. 8. FIG. 8 is a block diagram of the article management system according to the second modified example of the fourth embodiment.

As shown in FIG. 8, the article management system according to the second modified example also includes the user terminal 11, the indoor robot 12, the management server 20, the delivery terminal 40, and the sender terminal 50 as in the case of the article management system according to the first modified example shown in FIG. 7.

In the article management system according to the fourth embodiment shown in FIG. 6, the management server 20 transmits the article identification information id and the use information ui to the indoor robot 12. In contrast to this, in the article management system according to the second modified example shown in FIG. 8, the management server 20 stores the article identification information id and the use information ui while associating them with each other. Only the article identification information id is transmitted from the management server 20 to the indoor robot 12.

As shown in FIG. 8, when the user uses the article, the indoor robot 12 takes out the article from the storage place and delivers the article to the user. When doing so, the indoor robot 12 reads the article identification information id attached to the article and transmits the article identification information id to the management server 20. That is, the indoor robot 12 has the function of the reader 13 shown in FIG. 1. Upon receiving the article identification information id, the management server 20 extracts the use information ui associated with the article identification information id and transmits the extracted use information ui to the user terminal 11. Then, the user terminal 11 outputs the use information ui received from the management server 20 for the user.

As described above, in the article management system according to the second modified example, it is also possible to present the information about the use of the delivered article to the user at the same timing as the timing at which the user uses the article.

Note that the indoor robot 12 may not have the function of the reader, and instead, for example, a reader 13 for reading article identification information id may be separately provided in the storage place as shown in FIG. 1.

The rest of the configuration is similar to that of the fourth embodiment shown in FIG. 6, and therefore the description thereof is omitted.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An article management system configured to manage a delivered article by using a computer, the article management system comprising:
   an electronic commerce server;
   an indoor robot including one or more arms; and
   a delivery robot,
   wherein the computer is configured to:
      store identification information identifying food as the article to be delivered to a user thereof and use information including a manual for use of the article attached by a sender of the article while associating them with each other, the use information also including a cooking method, a best-before date and an eat-by date; and read, when the user uses the article, the identification information attached to the article, and extract and output the use information associated with the identification information simultaneously as a moving image on a monitor of a user terminal and as voice from a speaker of the user terminal;

the delivery robot is controlled to deliver the article to the indoor robot, the indoor robot is controlled to grasp the article via the one or more arms from the delivery robot and also store the article in a delivery box in a predetermined storage place indoors, the indoor robot configured to take out the article stored indoors stores the identification information and the use information while associating them with each other, when the user uses the article, the indoor robot takes out the stored article, delivers the article to the user, and extracts and outputs the use information associated with the identification information, when the indoor robot takes out the stored article, the indoor robot reads the identification information attached to the article and extracts the use information associated with the identification information, and the indoor robot erases the stored use information in response to taking out the stored article and outputting the use information, wherein:

the computer is further configured to:
  receive, via user input, order information relating to the article and including information about a commodity name, a quantity, a desired delivery date, and a delivery destination;
  transmit the order information to the indoor robot;
  present the information about the use of the delivered article at a same time as the timing at which the user uses the article; and
  check that the article is stored in the delivery box in the predetermined storage place indoors; and
the user purchases the article from an electronic commerce site on the Internet via the electronic commerce server that is managed by an electronic commerce vendor.

2. An article management method for managing a delivered article by using a computer, the article management method comprising:
  purchasing an article from an electronic commerce site on the Internet via an electronic commerce server that is managed by an electronic commerce vendor;
  storing identification information identifying food as the article to be delivered to a user thereof and use information including a manual for use of the article attached by a sender of the article while associating them with each other, the use information also including a cooking method, a best-before date and an eat-by date;
  reading, when the user uses the article, the identification information attached to the article, and extracting and outputting the use information associated with the identification information simultaneously as a moving image on a monitor of a user terminal and as voice from a speaker of the user terminal;
  controlling a delivery robot to deliver the article to an indoor robot;
  controlling the indoor robot including one or more arms to grasp the article via the one or more arms from the delivery robot and also store the article in a delivery box in a predetermined storage place indoors;
  taking out, by the indoor robot, the article stored indoors and storing, by the indoor robot, the identification information and the use information while associating them with each other;
  taking out, by the indoor robot, the stored article when the user uses the article and delivering the article to the user, and extracting and outputting the use information associated with the identification information;
  reading, by the indoor robot when the indoor robot takes out the stored article, the identification information attached to the article and extracting the use information associated with the identification information;
  erasing, by the indoor robot, the stored use information in response to taking out the stored article and outputting the use information;
  receiving, by the computer via user input, order information relating to the article and including information about a commodity name, a quantity, a desired delivery date, and a delivery destination;
  transmitting, by the computer, the order information to the indoor robot;
  presenting, by the computer, the information about the use of the delivered article at a same time as the timing at which the user uses the article; and
  checking, by the computer, that the article is stored in the delivery box in the predetermined storage place indoors.

3. A non-transitory computer readable medium storing an article management program for managing a delivered article, the article management program being configured to cause a computer to perform:
  purchasing an article from an electronic commerce site on the Internet via an electronic commerce server that is managed by an electronic commerce vendor;
  storing identification information identifying food as the article to be delivered to a user thereof and use information including a manual for use of the article attached by a sender of the article while associating them with each other, the use information also including a cooking method, a best-before date and an eat-by date;
  reading, when the user uses the article, the identification information attached to the article, and extracting and outputting the use information associated with the identification information simultaneously as a moving image on a monitor of a user terminal and as voice from a speaker of the user terminal;
  controlling a delivery robot to deliver the article to an indoor robot;
  controlling the indoor robot including one or more arms to grasp the article via the one or more arms from the delivery robot and also store the article in a delivery box in a predetermined storage place indoors;
  taking out, by the indoor robot, the article stored indoors and storing, by the indoor robot, the identification information and the use information while associating them with each other;
  taking out, by the indoor robot, the stored article when the user uses the article and delivering the article to the user, and extracting and outputting the use information associated with the identification information;
  reading, by the indoor robot when the indoor robot takes out the stored article, the identification information attached to the article and extracting the use information associated with the identification information;

erasing, by the indoor robot, the stored use information in response to taking out the stored article and outputting the use information;
receiving, via user input, order information relating to the article and including information about a commodity name, a quantity, a desired delivery date, and a delivery destination;
transmitting the order information to the indoor robot;
presenting the information about the use of the delivered article at a same time as the timing at which the user uses the article; and
checking that the article is stored in the delivery box in the predetermined storage place indoors.

* * * * *